US005720545A

United States Patent [19]

Shaw

[11] Patent Number: 5,720,545

[45] Date of Patent: Feb. 24, 1998

[54] REFRACTING OPTIC FOR FLUORESCENT LAMPS USED IN BACKLIGHTING LIQUID CRYSTAL DISPLAYS

[75] Inventor: James E. Shaw, Cedar Rapids, Iowa

[73] Assignee: Rockwell International, Costa Mesa, Calif.

[21] Appl. No.: 396,448

[22] Filed: Feb. 28, 1995

[51] Int. Cl.[6] .......... F21V 5/00; G02F 1/1335

[52] U.S. Cl. .......... 362/245; 362/29; 362/256; 349/64; 349/67; 349/70

[58] Field of Search .......... 359/40, 48, 49, 359/50, 69; 362/335–340, 216, 225, 255, 256, 244, 243, 245, 29, 224, 260, 308, 299, 309; 349/62, 64, 70

[56] References Cited

U.S. PATENT DOCUMENTS

| | | | |
|---|---|---|---|
| 1,880,892 | 10/1932 | Dodghe | 362/255 |
| 3,654,451 | 4/1972 | Starr | 362/224 |
| 4,488,208 | 12/1984 | Miller | 362/339 |
| 4,914,553 | 4/1990 | Hamada et al. | 359/50 |
| 5,079,681 | 1/1992 | Baba et al. | 362/256 |
| 5,202,950 | 4/1993 | Arego et al. | 359/50 |
| 5,278,545 | 1/1994 | Streck | 359/48 |

FOREIGN PATENT DOCUMENTS

| | | | |
|---|---|---|---|
| 2-94303 | 4/1990 | Japan | 359/50 |
| 5-107540 | 4/1993 | Japan | 359/50 |
| 5-281540 | 10/1993 | Japan | 359/50 |

*Primary Examiner*—William L. Sikes
*Assistant Examiner*—Tai V. Duong
*Attorney, Agent, or Firm*—Kyle Eppele; L. Keith Stephens; James P. O'Shaughnessy

[57] ABSTRACT

The present invention is a liquid crystal display with an improved backlighting system. A light source in the backlighting system radiates light in a first non-preferred direction. An optical apparatus coupled to the light source receives the light radiated by the light source in the first non-preferred direction and refracts it into a first preferred direction.

6 Claims, 5 Drawing Sheets

REFRACTING OPTIC FOR FLUORESCENT LAMPS USED IN BACKLIGHTING LIQUID CRYSTAL DISPLAYS

BACKGROUND OF THE INVENTION

The present invention relates to liquid crystal displays, and more particularly to systems for backlighting liquid crystal display matrices.

The principal of operation of liquid crystal displays (LCDs) is well known in the art, but for purposes of understanding the present invention, it can be stated that LCDs operate by reducing the transmissibility of light through a thin layer of liquid crystalline material when an electric field is applied. Since the effect is localized, shapes and characters can be drawn on an LCD by carefully controlling the application of the electric field. Unlike cathode ray tubes, which LCDs frequently replace, LCDs are not self-illuminating. Therefore, some sort of backlighting of the LCD matrix is typically required in order for an LCD to be viewed.

Projecting type LCDs require proper backlighting to assure good performance. The intensity of illumination of the LCD should be substantially uniform across the display matrix, and the light provided for illuminating the display matrix should preferably be at least partially columnated. Furthermore, in many applications such as in aircraft instrumentation, the backlighting system must be as compact as possible since the available space is very limited. Typically, backlighting is accomplished by locating one or more fluorescent lamps or lamp sections in a sealed cavity behind the LCD matrix. A diffuser is generally located between the LCD matrix and the one or more lamp sections in order to facilitate viewing of the LCD from a variety of angles.

The fluorescent lamp sections are generally formed from one or more elongated cylindrical bulbs. The one or more bulbs are generally arranged such that a number of lamp sections are aligned adjacent and relatively parallel to one another. Most of the light from front surfaces of the lamp sections is readily usable in providing light for illuminating the LCD matrix. However, this arrangement can be inefficient since little light radiated from the lamp sections in other directions is usable for backlighting. Parabolic type reflectors have been employed in some backlighting system designs for reflecting light radiated from the rear surfaces of the lamp sections back toward the LCD matrix. However, even with the use of these reflectors, a significant portion of the light generated by the lamps is lost or is used inefficiently.

Light generated by the lamps can be lost in a number of different manners. For instance, a large share of the light generated from a particular lamp section is radiated from the sides of the lamp section toward adjacent lamp sections. It is believed that a majority of the light radiated into adjacent lamp sections is not recovered for use in backlighting the LCD matrix. This type of loss is sometimes referred to as lamp-to-lamp absorption.

Light can also be lost due to reflection at the diffuser surface. Light from each lamp section which strikes the diffuser surface with a high angle of incidence relative to the normal to the diffuser surface will be reflected instead of refracted through the diffuser. Although some of the light reflected at the diffuser surface may be recovered for backlighting the LCD matrix, it is believed that a substantial portion of this reflected light is not recovered. In some LCD backlighting system designs, it is believed that as much as 40 percent of the total light generated is lost due to either lamp-to-lamp absorption or due to reflection at the diffuser surface.

Powering the lamps of a backlighting system frequently accounts for over 50 percent of the total power consumption of an LCD backlit device. In most applications, it is desirable to minimize power consumption of the LCD backlit device. Utilizing more of the light generated by the fluorescent lamps would allow backlighting systems to employ lower wattage lamps to accomplish the backlighting, thus reducing power consumption of the LCD backlit device. Additionally, in some applications, it is desirable to have the backlighting system supply a more columnated source of light. Consequently, a need exists for an improved LCD backlit device in which a higher percentage of generated light is successfully utilized in backlighting the LCD matrix and in which the light supplied is more columnated.

The present invention discloses a variety of embodiments of such an apparatus.

SUMMARY OF THE INVENTION

It is an object of the present invention to provide an LCD with an improved backlighting system. It is a second object of the invention to provide an LCD which operates with lower power consumption than conventional LCDs. It is a third object of the invention to provide an apparatus for redirecting light generated by the backlighting system lamps in one of several "loss" regions, toward the LCD light diffuser at an angle which allows the light to be more efficiently utilized. It is a fourth object of the invention to provide an apparatus which helps to provide a more columnsted source of light for illuminating the LCD matrix.

The present invention includes an apparatus for illuminating a flat panel display. The apparatus includes a light source which radiates light in a first non-preferred direction. The apparatus also includes an optical mechanism coupled to the light source such that it receives light radiated by the light source in the first non-preferred direction and refracts it into a first preferred direction.

BRIEF DESCRIPTION OF THE DRAWINGS

The invention may be more fully understood by reading the following description of preferred embodiments of the invention in conjunction with the appended drawings wherein.

DESCRIPTION OF THE PREFERRED EMBODIMENTS

Figure 1:
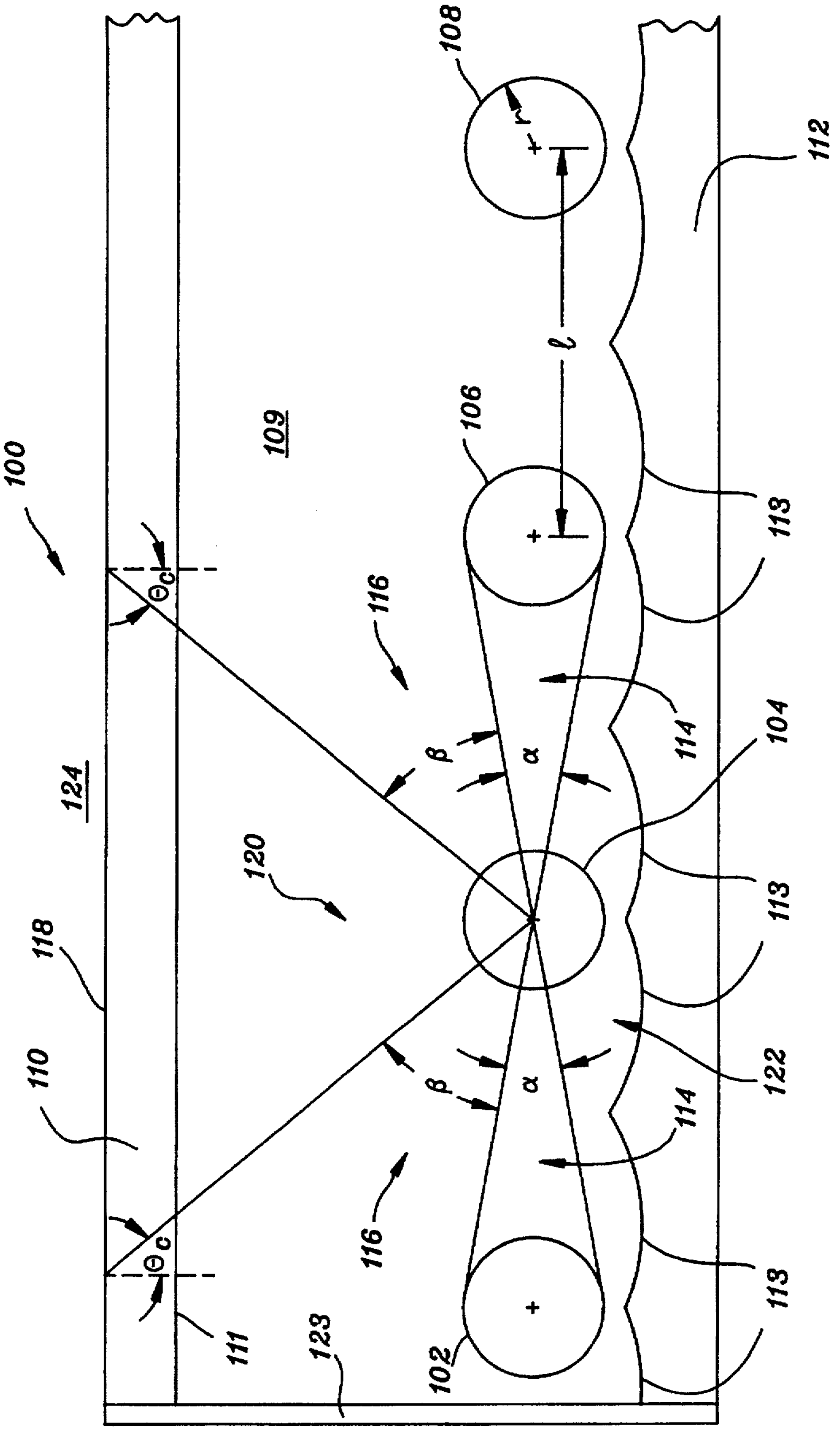
PRIOR ART FIG. 1
FIG. 1 is a diagramatic illustration of a backlighting system for use in illuminating an LCD matrix.

FIG. 1 is a diagramatic view of a prior art backlighting system 100 for use in illuminating flat panel displays.

Backlighting system 100 is particularly adapted for illuminating an LCD matrix of an LCD display. Backlighting system 100 includes lamp section 102, lamp section 104, lamp section 106, lamp section 108, medium 109, light diffuser 110, reflector assembly 112, sidewall 123 and medium 124. In preferred embodiments, each of lamp sections 102, 104, 106 and 108 are sections of a single serpentine fluorescent bulb. However, in other embodiments, each of lamp sections 102, 104, 106 and 108 is a separate fluorescent bulb. The one or more fluorescent bulbs are preferably cylindrical, but frequently, they have an oval or other non-planar shape.

Reflector assembly 112 includes multiple reflectors 113 articulated to follow the paths of lamp sections 102, 104, 106 and 108. The lamp sections are secured in place so that each lamp section is adjacent to and aligned with one or more of reflectors 113 of reflector assembly 112.

Diffuser 110 is secured in a position adjacent to and a short distance in "front" of lamp sections 102, 104, 106 and 108. Diffuser 110 is positioned on an opposite side of the lamp sections than reflector assembly 112. First diffuser surface 111 faces the lamp sections, while second diffuser surface 118 faces the LCD matrix (not shown). Diffuser 110 receives light from each of the lamp sections at first diffuser surface 111 and distributes the light from second diffuser surface 118 to create a blended or continuous illumination effect, so that the positions of the individual lamp sections are not seen when a user views the LCD. Additionally, diffuser 110 can be of the type that allows the projected image to be seen from a range of different viewing angles. Otherwise, the image can only be viewed from the specular reflection angle.

Each of lamp sections 102, 104, 106 and 108 radiates light from its center outward in all directions. For purposes of illustration, discussion herein is limited to light radiated from lamp section 104. Since lamp section 104 radiates light in all directions (360 degrees) from its center, some of the light radiated from lamp section 104 is directed toward surface 111 of diffuser 110 with an angle of incidence $\theta_I$ relative to the normal to surface 111. This light is scattered by the diffuser medium into multiple directions, with the greatest percentage of light being scattered through the diffuser along the axis of $\theta_I$. In other words, the greatest percentage of light passing through diffuser 110 strikes surface 118 with the same angle of incidence $\theta_I$ as the light originally striking surface 111. Once reaching diffuser/air interface 118 on the side opposite the lamps, a large percentage of the light is reflected due to the total internal reflection at surface 118. This occurs when the scattered light reaching diffuser/air interface 118 strikes it at an angle greater than critical angle $\theta_C$ for the diffuser.

Critical angle $\theta_C$ is defined as the smallest angle of incidence at which a light ray passing from the medium of diffuser 110 to medium 124 will be totally reflected at surface 118. Light striking surface 118 with angle of incidence $\theta_I$ less than critical angle $\theta_C$ will be at least partially refracted through diffuser 110. Light striking surface 118 with angle of incidence $\theta_I$ greater than critical angle $\theta_C$ will be totally reflected. As shown in FIG. 1, most of the light radiated by lamp section 104 in zone 120 will strike surface 118 with an angle of incidence small enough to ensure at least partial refraction of the light through diffuser 110.

Light radiated from the rear or back portions of lamp section 104 in zone 122 is directed toward reflectors 113 of reflector assembly 112. Preferably, this light is reflected back toward diffuser 110 such that a high percentage of it strikes surface 111 of diffuser 110 with an angle of incidence smaller than critical angle $\theta_C$. However, it is believed that some of the light reflected by reflector assembly 112 strikes surface 111 with an angle of incidence larger than critical angle $\theta_C$. This causes a portion of the energy to pass through diffuser 110 and strike surface 118 at an angle greater than the angle $\theta_C$ which would result in total internal reflection at surface 118.

It is believed that much of the light radiated by lamp section 104, which is directed toward either of adjacent lamp sections 102 or 106, is not recovered for use in illuminating the LCD matrix. Loss regions or zones 114 indicate regions in which light radiated by lamp section 104 will strike one of adjacent lamp sections 102 and 106. The percentage of light lost in one of loss zones 114 from either side of lamp section 104 is dependent upon angle α, where:

Eq. 1

$$\alpha = 2 * \mathrm{TAN}^{-1}\left(\frac{r}{l}\right)$$

where:

r is the radius of the lamp sections; and

ι is the distance between the centers of adjacent lamp sections.

Light radiated by lamp section 104 which will strike surface 111 with angle of incidence $\theta_I$ greater than critical angle $\theta_C$ is represented by zones 116. A large percentage of this light will therefore also strike surface 118 at an angle greater than critical angle $\theta_C$. The percentage of light potentially lost due to total reflection in zones 116 is dependent upon angle β and the scattering properties of the diffuser. Since both critical angle $\theta_C$ and angle α can be determined, angle β can be calculated as follows:

Eq. 2

$$\beta = C_1\theta_C - \frac{\alpha}{2}$$

Where $C_1$ describes the degree (%) of scatter as a function of diffuser thickness, material, and angle of incidence of light.

The total percentage of light losses $L_T$ from each lamp section can be shown to be as high as:

Eq. 3

$$L_T = \frac{2*(\beta+\alpha)}{360}\ \%$$

For many backlighting systems, these losses can be on the order of 40% of the total light radiated. It should be noted that each of lamp sections 102, 104, 106 and 108 will incur similar losses, depending upon factors such as the existence of adjacent lamp sections or the presence of a structure such as side wall 123, which can cause lamp-to-lamp or lamp-to-structure absorption.

Figure 2:
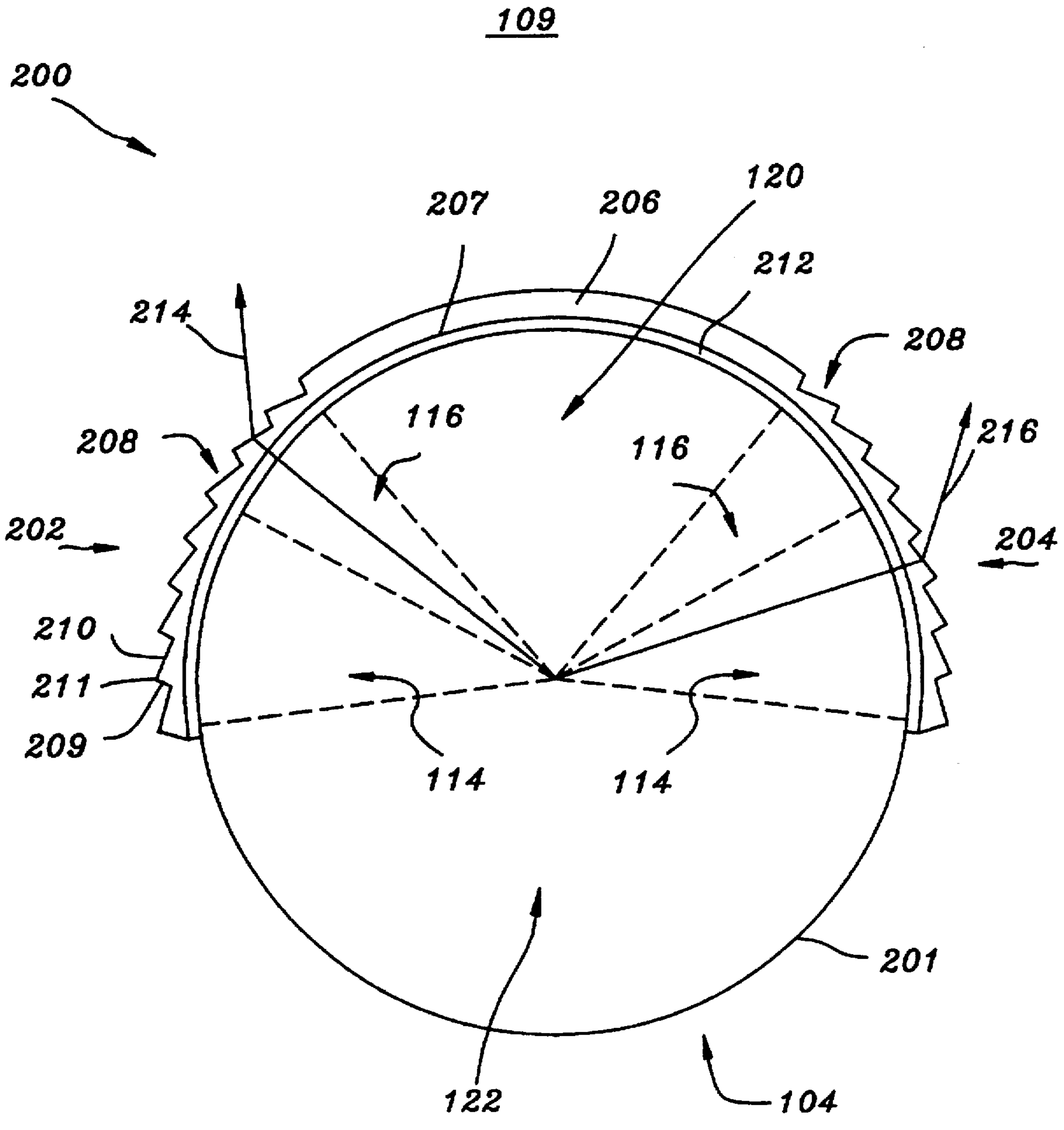
FIG. 2 is a diagramatic illustration of a first preferred embodiment of an optical apparatus for use with a backlighting system of the type shown in FIG. 1.

FIG. 2 is a diagramatic illustration of a first preferred embodiment of optic or optical apparatus 200 for use with lamp sections of backlighting system 100. However, for ease of illustration, optic 200 is shown only in relation to lamp section 104. Optic 200 includes first optic section 202, second optic section 204 and third or middle optic section 206. Inner wall 207 of optic 200 is shared by each of optic sections 202, 204 and 206. First optic section 202 corresponds to and is adjacent with loss zones 114 and 116 on a first side of lamp section 104. Second optic section 204 corresponds to and is adjacent with loss zones 114 and 116 on a second side of lamp section 104. Third optic section 206 joins first and second optic sections 202 and 204 and is adjacent to the front portion of lamp section 104. Light radiated in zone 120 passes through optic section 206 and medium 109 and strikes surface 111 of diffuser 110 with the majority of energy striking at an angle of incidence of less than critical angle $\theta_C$ at interface 118, so that less total internal reflection occurs.

Figure 3:
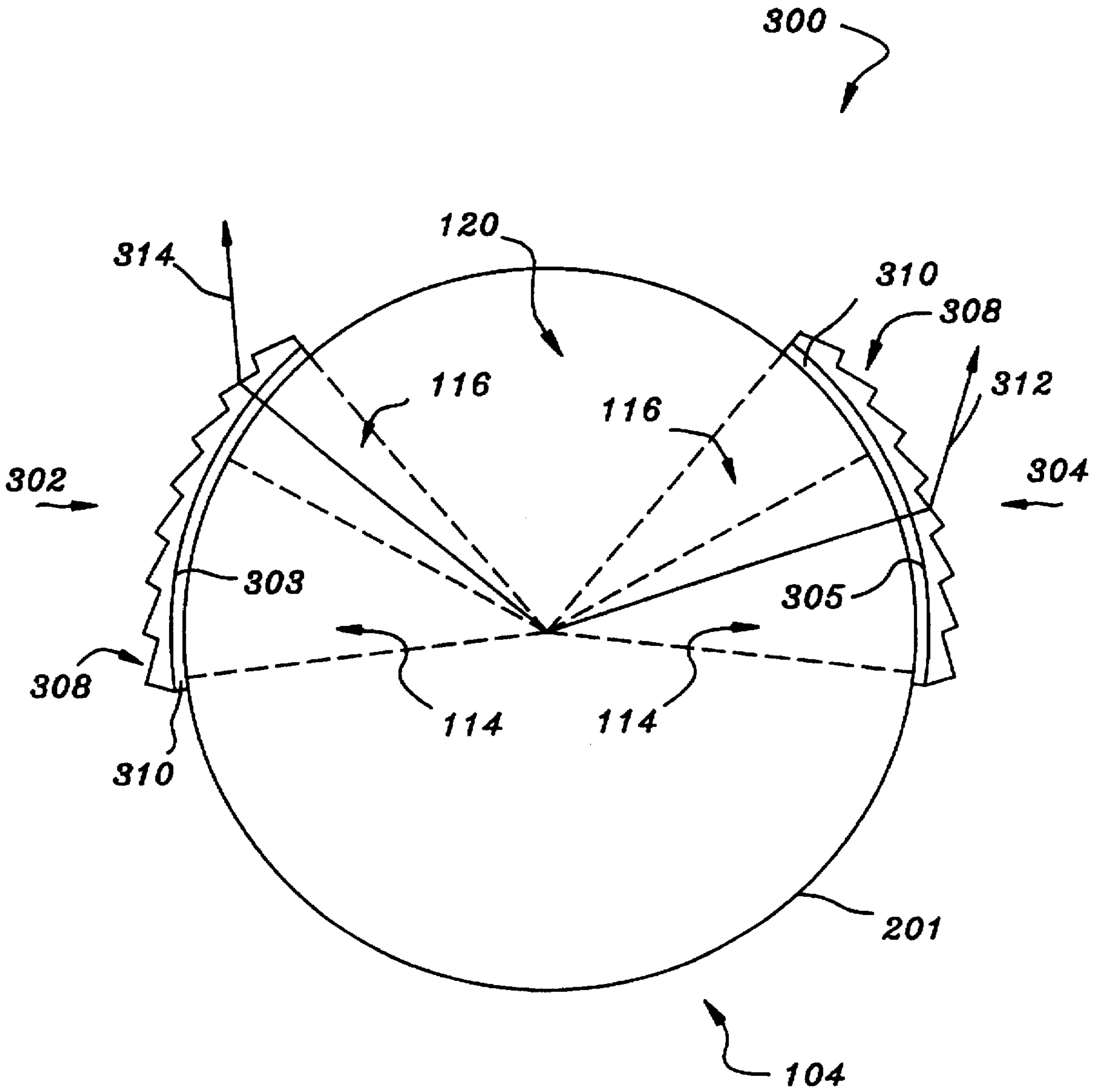
FIG. 3 is a diagramatic illustration of a second embodiment of an optical apparatus for use in a backlighting system of the type shown in FIG. 1.
Figure 4:
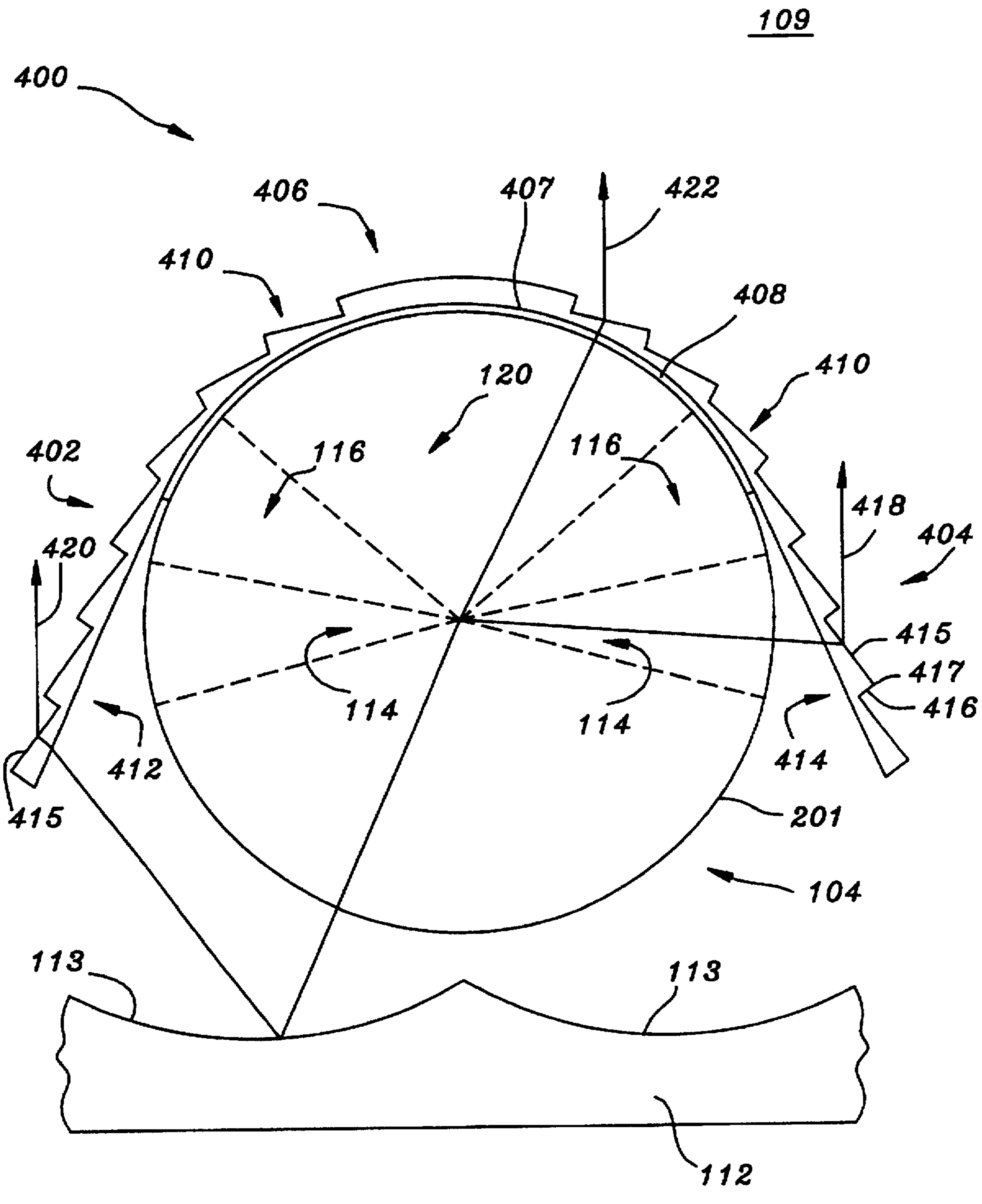
FIG. 4 is a diagramatic illustration of a third embodiment of an optical apparatus for use in a backlighting system of the type shown in FIG. 1.
Figure 5:
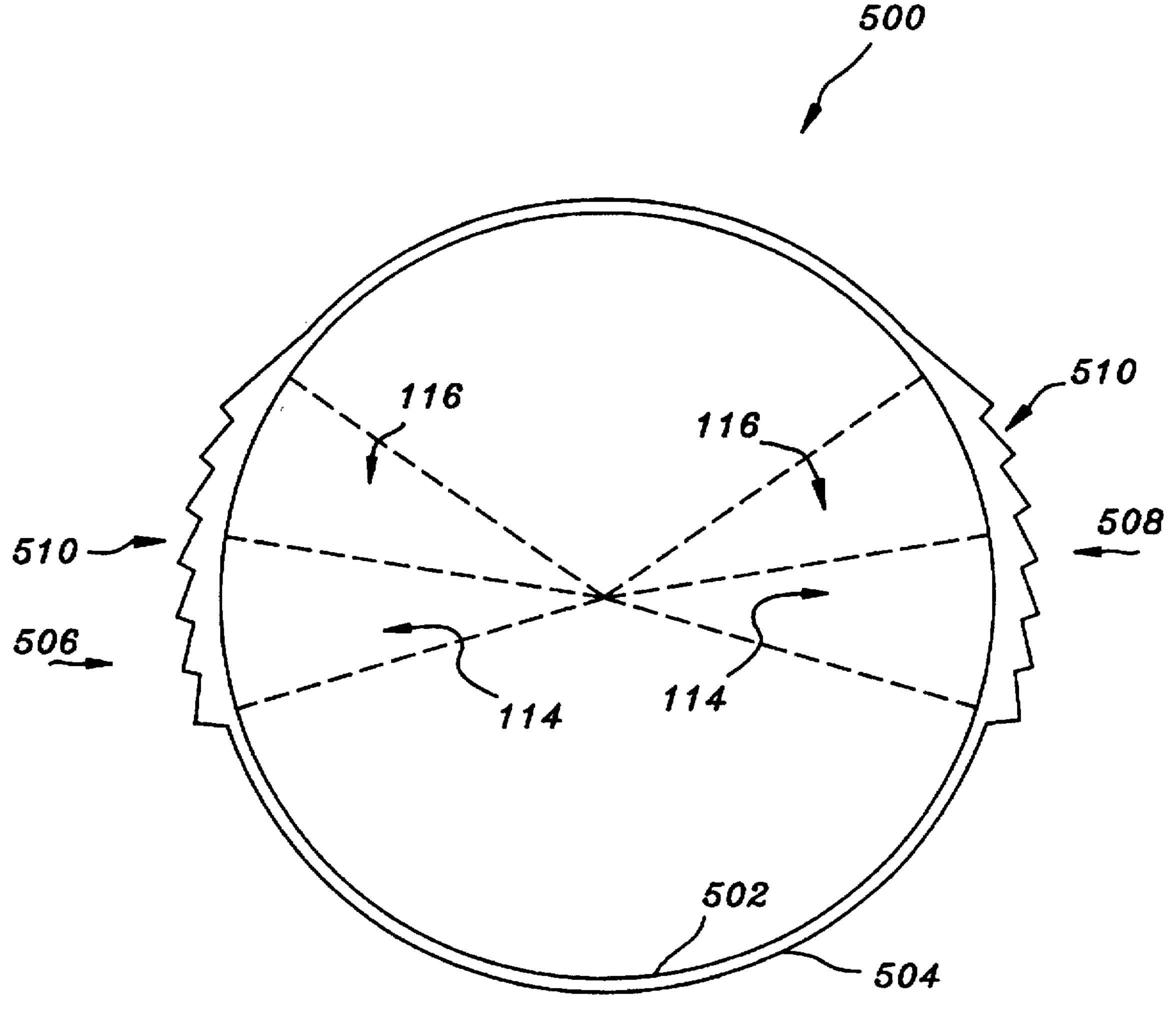
FIG. 5 is a diagramatic illustration of a lamp section of a backlighting system which includes an integrated optical apparatus.

In preferred embodiments, optic 200 is formed from a polycarbonate material. However, in other embodiments optic 200 can also be formed from other materials. For instance, the low light loss rate of glass makes it a desirable material for use in forming optic 200. However, forming optic 200 from glass has its setbacks as glass can be difficult to position around lamp section 104 after it is formed. Note that each of optics 300, 400 and 500 discussed below with reference to FIGS. 3 through 5 are preferably made from substantially the same materials as optic 200.

Each of optic sections 202 and 204 include a plurality of individual lens segments 208. Each lens segment 208 has a first lens surface 209 and a second lens surface 210 which are joined at a peak 211. In preferred embodiments, lens segments 208 are designed to create a Fresnel type of lens structure for redirecting light radiated by lamp section 104 in zones 114 and zones 116 toward diffuser 110. The redirected light from zones 114 and zones 116 preferably has an angle of incidence less than critical angle $\theta_C$ in order to reduce total reflection at surface 118.

Optic 200 is, in some preferred embodiments, formed and then subsequently coupled or secured to lamp section 104 with layer 212 of index matching adhesive applied between surface 207 of optic 200 and outer surface 201 of lamp section 104. It is believed that layer 212 of index matching adhesive can be any adhesive material with an index of refraction matching either the index of refraction of the walls of lamp section 104 or the index of refraction of optic 200, or having an index value between these two extremes. For example, the adhesive material can be chosen such that its index of refraction is centered between the indexes of refraction of lamp section 104 and optic 200.

In other preferred embodiments, optic 200 is formed by placing an optically transparent formable or shapable material with a high index of refraction around lamp section 104. Next, a mold is placed over lamp section 104 to form the optically transparent material into the shape of optic 200. After the material hardens, the mold can be removed and the material itself becomes optic 200.

In operation, optic 200 works as follows. Light radiated by lamp section 104 in zone 122 toward reflection assembly 112 is left substantially unaffected and allowed to reflect off of reflectors 113 back toward diffuser 110. Light directed toward the front of lamp section 104 in zone 120 is also left substantially unaffected as it passes through optic section 206. Light radiated by lamp section 104 in one of loss zones 114 or one of loss zones 116 passes through wall 201 of lamp section 104 and layer 212 of index matching adhesive and into one of lens segments 208 of optic 200. At surface 210 of the particular lens segment, the index of refraction between the optical material comprising optic 200 and medium 109 dictates the degree of refraction of the light ray.

For example, light ray 214 initially radiates from the center of lamp section 104 in a direction which is in one of loss zones 116. If light ray 214 remained unaffected, it would strike surfaces 111 and 118 of diffuser 110. Some of this energy would strike surface 118 with an angle of incidence greater than critical angle $\theta_C$. If ray 214 is scattered to an angle greater than $\theta_C$, total reflection of light ray 214 would result. To avoid total reflection of light ray 214 at surface 118, corresponding lens segment 208 is angled or oriented in order to achieve refraction of light ray 214 toward surface 111 with a more preferred angle of incidence, thereby reducing the probability that ray 214 would be reflected and absorbed in the form of heat in the system.

Similarly, light ray 216 is radiated from the center of lamp section 104 in a direction which may result in light ray 216 being absorbed into an adjacent lamp section and lost for its intended purpose of illuminating the LCD matrix. However, the corresponding one of lens segments 208 of optic section 204 is oriented such that the resulting refraction of light ray 216 redirects light ray 216 toward diffuser 110 at a preferred angle of incidence, thereby increasing the probability of it passing through interface 118.

Ideally, each of lens segments 208 redirects all of the light it receives into a preferred direction so that all the light can be used to illuminate the LCD matrix. However, light rays which are refracted by a particular one of lens segments 208, but which strike surface 209 or peak 211 of an adjacent lens segment, are not likely to be fully recovered. In many instances, light which strikes surface 209 or peak 211 of an adjacent lens segment will be refracted again into a non-preferred direction. In order to increase the efficiency of optic 200 to ensure that as little refracted light as possible is obstructed by surfaces 209 and peaks 211 of adjacent lens segments, surfaces 209 and 210 of each lens segment are oriented orthogonal to one another. Thus, the percentage of light successfully redirected for use in backlighting the LCD matrix is maximized.

Each of lens segments 208 can redirect light toward diffuser 110 at a slightly different angle so long as most of the redirected light strikes surface 118 at angles small enough to avoid total reflection. However, in some preferred embodiments, it is desirable to provide a more columnated source of light. In these embodiments, essentially all of the light redirected by lens segments 208 is caused to strike surface 111 with substantially the same angle of incidence. Typically, the light in these embodiments will be caused by optic 200 to strike the diffuser in a direction which is substantially perpendicular to surface 111. In embodiments in which a columnated source of light is desired, optic section 206 can include lens segments 208 as well as to aid in redirecting light radiated in zone 120 into the preferred direction. FIG. 4 illustrates such an embodiment.

FIG. 3 is a diagramatic illustration of a second embodiment of an optical apparatus for use with lamp section 104 of backlighting system 100. Optic 300 is similar to optic 200 in that it includes first and second optic sections. First optic section 302 is identical or substantially similar to optic section 202 shown in FIG. 2. Second optic section 304 is identical or substantially similar to optic section 204. Inner surface 303 of first optic section 302 and inner surface 305 of second optic section 304 are secured to outer surface 201 of lamp section 104 by layer 310 of index matching adhesive. Optic section 302 is positioned adjacent loss zone 114 and loss zone 116 on a first side of lamp section 104. Optic section 304 is positioned adjacent to loss zone 114 and loss zone 116 on the second side of lamp section 104.

Unlike optic 200 shown in FIG. 2, optic 300 does not include an optic section adjacent the front of lamp section 104 in zone 120. Eliminating the optic section adjacent to lamp section 104 in zone 120 provides a number of advantages. First, it results in a reduction of material used to fabricate optic 300. Second, optic sections 302 and 304 of optic 300 can be secured or coupled to lamp section 104 without bending or otherwise deforming optic 300, as is typically required with optic 200. Therefore, optic 300 can be formed from glass or other rigid optical materials. The low light loss rate of materials such as glass makes this an important feature of optic 300. Additionally, optic 300 has zero loss in section 120 which can occur due to the absorption of light energy in an optical medium.

Optic 300 otherwise functions substantially the same as optic 200. For instance, light rays 312 and 314 are radiated from lamp section 104 in one of loss zones 114 and one of loss zones 116. Accordingly, light rays 312 and 314 are refracted by corresponding lens segments 308 of optic sections 302 and 304 and are thereby redirected toward diffuser 110 at a preferred angle.

FIG. 4 is a diagramatic illustration of a third embodiment of an optical apparatus for use with lamp section 104 of backlighting system 100. Optic 400 helps to reduce the percentage of light lost after refraction by a lens segment due to the presence of an adjacent lens segment's peak. Optic 400 also helps to provide a more columnated light source for backlighting the LCD matrix. Additionally, optic 400 also helps reduce lamp-to-lamp and lamp-to-structure absorption of light energy reflected from surface 113 into adjacent lamps or structure 123.

Optic 400 includes first optic section 402 positioned adjacent loss zones 114 and 116 on a first side of lamp section 104, second optic section 404 positioned adjacent loss zones 114 and 116 on a second side of lamp section 104, and third optic section 406 coupled between optic sections 402 and 404 and positioned adjacent to zone 120 in the front portion of lamp section 104. In third optic section 406, and preferably in portions of optic sections 402 and 404 as well, inner surface 407 of optic 400 has a curvature chosen to match the curvature of outer wall 201 of lamp section 104. Layer 408 of index matching adhesive secures this portion of optic 400 to outer wall 201.

Each of optic sections 402, 404 and 406 include a plurality of lens segments 410. Like lens segments 208 and 308 discussed previously, lens segments 410 are designed to receive light radiated by lamp section 104 and to refract the received light into desired directions so that it strikes diffuser 110 with a pre-determined angle of incidence. Notably, optic 400 has some distinct features which aid in redirecting light radiated by lamp section 104.

For example, optic sections 402 and 404 include extensions or extended portions 412 and 414, respectively. In extended portions 412 and 414, inner surface 407 of optic 400 is substantially straight instead of having a curvature similar to the curvature of lamp section 104. The relatively straight disposition of extended portions 412 and 414 results in lens segments 410 in these portions of optic 400 being at least slightly separated from outer surface 201 of lamp section 104.

Extended portions 412 and 414 provide several advantages. First, lens segments 410 in extended portions 412 and 414 can be positioned to obtain an optimal orientation of surfaces 415. In these embodiments, the optimal orientation of surfaces 415 is the position of these surfaces which will result in a minimum percentage of refracted light striking surfaces 416 and peaks 417 of adjacent lens segments. A second advantage provided by extended portions 412 and 414 is the capability of extended portions 412 and 414 receiving light reflected by reflectors 113, and refracting the light to provide a more columnated light source and possibly less lamp-to-lamp or lamp-to-structure absorption.

Providing a more columnated light source is also achieved by including lens segments 410 in third optic section 406. However, it must be noted that extended portions 412 and 414 can be used in an optic which does not include lens segments in third optic section 406. Likewise, lens segments can be included adjacent zone 120 in other embodiments of the optical apparatus of the present invention separately from use of extended portions 412 and 414.

In operation, optic 400 operates with lamp section 104 as follows. Light rays such as light ray 418 are radiated in one of loss zones 114 or one of loss zones 116. Light ray 418 passes through outer wall 201 of lamp section 104 and medium 109 and into a corresponding one of lens segments 410. At surface 415 of the particular lens segment, light ray 418 is defracted toward diffuser 110 in a preferred direction.

Light ray 420 is radiated from the back of lamp section 104 such that it is reflected by reflector 113 into a direction which will intersect optic section 402 and enter a corresponding one of lens segments 410. At surface 415 of the particular lens segment involved, light ray 420 is defracted toward diffuser 110 in a preferred direction.

Light ray 422 is radiated from lamp section 104 in zone 120 such that, even without being redirected by optic 400, after being scattered a high percentage of it will strike surface 118 of diffuser 110 at angles sufficient to avoid total reflection. However, in embodiments in which a columnated source of light is desired, it is preferable that light ray 422 strike surface 111 at substantially the same pre-determined angle as light rays such as rays 418 and 420. In these embodiments, light ray 422 will be refracted accordingly at surface 415 of the corresponding one of lens segments 410.

FIG. 5 is a diagramatic illustration of an optical apparatus integrated into a lamp section of a backlighting system such as backlighting system 100. Integrated optic lamp 500 has inner wall 502 and outer wall 504. First optic section 506 and second optic section 508 are integrally formed into outer wall 504 or alternatively between walls 502 and 504.

Integrally forming optic sections 506 and 508 into the lamp can be accomplished in at least two different manners. First, hot tooling methods can be used to originally form the glass of the lamp to create lens segments 510 in the desired lens structure. This is a preferred method due to the relative ease of implementation. A second and slightly more difficult method of forming optic sections 506 and 508 in the glass of the lamp is to manually cut or alter outer lamp section wall 504 to form first and second optic sections 506 and 508.

As shown in FIG. 5, optic sections 506 and 508 are formed such that lens segments 510 are positioned only in zones 114 and 116. However, it is clear that lens segments can be formed in the front portion of the lamp to accomplish the same columnating effect as discussed with respect to FIG. 4.

While particular embodiments of the present invention have been shown and described, it should be clear that changes and modifications may be made to such embodiments without departing from the true scope and spirit of the invention. It is intended that the appended claims cover all such changes and modifications.

I claim:

1. A backlight comprising:

a front side including a diffuser;

a right side including a right side reflector;

a left side including a left side reflector;

a rear side including a rear reflector a right lamp segment;

a left lamp segment;

a center lamp segment, disposed between said right lamp segment and said left lamp segment;

said right lamp segment disposed nearer said right side than said left lamp segment and said center lamp segment;

said left lamp segment disposed nearer said left side than said right lamp segment and said center lamp segment;

said center lamp segment having a center lamp right side and an opposing center lamp left side such that light emanating from said center lamp right side is initially directed toward said right lamp segment while light emanating from said center lamp left side is initially directed toward said left lamp segment;

means, disposed between said center lamp right side and said right lamp segment for refracting light such that light initially directed from said center lamp right side toward said right lamp segment is refracted in a direction towards said front side; and, a refractive element disposed between said left lamp segment and said center lamp left side such that light initially directed from said center lamp left side toward said left lamp segment is refracted and directed toward said front side.

2. A backlight of claim 1 wherein said refractive element has first and second sides, said refractive element positionable around the center lamp segment such that the first side of the refractive element is adjacent the center lamp segment, the first side of the refractive element having an arcuat shape adapted for coupling the refractive element to the center lamp segment, and wherein the second side of the refractive element includes a plurality of individual lens segments, each of the plurality of lens segments adapted to receive light from the center lamp segment and refract light into a direction toward said front side.

3. A backlight of claim 2 wherein the refractive element is coupled to the center lamp segment by a layer of index matching adhesive.

4. A backlight of claim 3 wherein the plurality of lens segments are positioned relative to one another such ,that a percentage of light refracted by one of the plurality of lens segments and subsequently intercepting light refracted by an adjacent one of the plurality of lens segments is minimized.

5. A backlight of claim 4 wherein the refractive element is a Fresnel type lens.

6. A backlight comprising:

a front side including a diffuser;

a right side including a right side reflector;

a left side including a left side reflector;

a rear side including a rear reflector;

a right lamp segment;

a left lamp segment;

a center lamp segment, disposed between said right lamp segment and said left lamp segment;

said right lamp segment disposed nearer said right side than said left lamp segment and said center lamp segment;

said center lamp segment having a center lamp right side and an opposing center lamp left side such that light emanating from said center lamp right side is initially directed towards said right lamp segment while light emanating from said center lamp left side is initially directed toward said left lamp segment;

an optical element coupled to said center lamp segment and having an optical element right side and an optical element left side disposed adjacent the center lamp right side and the center lamp left side respectively;

said optical element including a plurality of lens segments each of the plurality of lens segments having a first surface and a second surface, the first and second surfaces of each of the plurality of lens segments being so disposed and arranged as to be substantially perpendicular to one another, each of the plurality of lens segments being positioned adjacent a different portion of the center lamp segment such that light initially directed toward the right lamp segment and the left lamp segment is cause to be refracted and directed in a direction toward said front side;

said optical element having an inner surface coupled to each of the plurality of lens segments and to the center lamp segment, the inner surface having a curvature substantially the same as a curvature of the center lamp segment.

* * * * *